(12) United States Patent
Datta et al.

(10) Patent No.: US 12,367,699 B2
(45) Date of Patent: Jul. 22, 2025

(54) SYSTEMS, METHODS, AND DEVICES FOR HEAD POSE DETERMINATION

(71) Applicant: Intel Corporation, Santa Clara, CA (US)

(72) Inventors: Parual Datta, Bangalore (IN); Nilesh Ahuja, Cupertino, CA (US); Javier Felip Leon, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 986 days.

(21) Appl. No.: 17/191,718

(22) Filed: Mar. 4, 2021

(65) Prior Publication Data
US 2021/0279506 A1 Sep. 9, 2021

(30) Foreign Application Priority Data
Dec. 18, 2020 (IN) .............................. 202041055251

(51) Int. Cl.
 *G06V 40/10* (2022.01)
 *G06F 18/22* (2023.01)
(52) U.S. Cl.
 CPC ............ *G06V 40/103* (2022.01); *G06F 18/22* (2023.01); *G06V 2201/12* (2022.01)
(58) Field of Classification Search
 None
 See application file for complete search history.

(56) References Cited

U.S. PATENT DOCUMENTS

| | | | |
|---|---|---|---|
| 2005/0031195 A1* | 2/2005 | Liu | G06V 40/169 345/582 |
| 2009/0132371 A1* | 5/2009 | Strietzel | G06Q 30/02 705/14.46 |
| 2010/0111370 A1* | 5/2010 | Black | G06F 18/2321 705/26.1 |

(Continued)

OTHER PUBLICATIONS

Ruiz, Nataniel et al.; "Fine-Grained Head Pose Estimation Without Keypoints";https://openaccess.thecvf.com/content_cvpr_2018_workshops/papers/w41/Ruiz_Fine-Grained_Head_Pose_CVPR_2018_paper.pdf; Computer Science; 2018; 10 pages; CVF Conference on Computer Vision and Pattern Recognition Workshops (CVPRW).

(Continued)

*Primary Examiner* — Delomia L Gilliard
(74) *Attorney, Agent, or Firm* — Viering, Jentschura & Partner mbB; Robert M Bilotta, Jr.

(57) ABSTRACT

Estimating a head pose may include obtaining sensor data corresponding to a head and at least a portion of the body of a human subject and determining an estimate of a three-dimensional (3D) body pose using the obtained sensor data. The estimation can further include generating a first rendering of at least the human subject's head using the obtained sensor data and generating a plurality of head pose sample data sets by applying the estimated 3D body pose to a head-pose generative model. Further, the head pose estimation can include generating a plurality of second renderings respectively from each of the plurality of head pose sample data sets; determining which of the plurality of second renderings is closest to the first rendering; and selecting the second rendering determined to be closest to the first rendering.

20 Claims, 3 Drawing Sheets

(56) References Cited

U.S. PATENT DOCUMENTS

| | | | | |
|---|---|---|---|---|
| 2013/0142390 | A1* | 6/2013 | Othmezouri | G06V 40/10 382/103 |
| 2013/0271458 | A1* | 10/2013 | Andriluka | G06V 40/23 345/619 |
| 2016/0063752 | A1* | 3/2016 | Woo | G06T 15/005 345/420 |
| 2019/0035149 | A1* | 1/2019 | Chen | G06V 40/166 |
| 2019/0180469 | A1* | 6/2019 | Gu | G06V 40/167 |
| 2019/0333267 | A1* | 10/2019 | Black | G06F 18/2321 |
| 2020/0193614 | A1* | 6/2020 | Tadi | G06T 19/20 |
| 2022/0083125 | A1* | 3/2022 | Lefaudeux | G06N 20/00 |
| 2023/0400914 | A1* | 12/2023 | Lefaudeux | G06N 20/00 |
| 2024/0029345 | A1* | 1/2024 | Selvert | G06T 19/20 |

OTHER PUBLICATIONS

Yang, Tsun-Yi et al., "FSA-Net: Learning Fine-Grained Structure Aggregation for Head PoseEstimation from a Single Image", https://openaccess.thecvf.com/content_CVPR_2019/papers/Yang_FSA-Net_Learning_Fine-Grained_Structure_Aggregation_for_Head_Pose_Estimation_From_CVPR_2019_paper.pdf; IEEE, Jun. 2019; 10 pages; 2019 IEEE/CVF Conference on Computer Vision and Pattern Recognition (CVPR); Long Beach, CA, USA.

Cao, Xudong et al.; "Face Alignment by Explicit Shape Regression"; https://www.microsoft.com/en-us/research/wp-content/uploads/2013/01/Face-Alignment-by-Explicit-Shape-Regression.pdf; IEEE, Jun. 2012, 14 pages; IEEE Conference on Computer Vision and Pattern Recognition; Providence, RI, USA.

Liang, Lin et al.; "Face Alignment via Component-based Discriminative Search"; http://jiansun.org/papers/ECCV08_FaceAlign.pdf; Proceedings, Part II; Oct. 2008; Computer Vision—ECCV 2008, 14 pages; 10th European Conference on Computer Vision; Marseille, France.

Ranjan, Rajeev et al.; "HyperFace: A Deep Multi-task Learning Framework for Face Detection, Landmark Localization, Pose Estimation, and Gender Recognition," Cornell University arXiv e-prints, arXiv: 1603.01249, Mar. 3, 2016; 16 pages; https://arxiv.org/abs/1603.01249.

Zhu, Xiangyu et al.; "Face Alignment Across Large Poses: A 3D Solution", Cornell University arXiv e-prints, arXiv: 1511.07212, https://arxiv.org/abs/1511.07212 (last visited Nov. 25, 2020); Nov. 23, 2015; 11 pages; vol. 1.

Cao, Zhe et al.; "OpenPose: Realtime Multi-Person 2D Pose Estimation using Part Affinity Fields"; Cornell University arXiv e-prints; arXiv: 1812.08008; vols. 1-2; 1-328(28 Pages) (2018-2019), https://arxiv.org/abs/1812.08008v1 (last visited Nov. 25, 2020). Individual volumes are identified as follows: vol. 1 = pp. 1-14; vol. 2 = pp. 15-28.

Dey, Debargha et al., "Gaze Patterns in Pedestrian Interaction with Vehicles: Towards Effective Design of External Human-Machine Interfaces for Automated Vehicles", Sep. 2019, pp. 369-378, AutomotiveUI '19: Proceedings of the 11th International Conference on Automotive User Interfaces and Interactive Vehicular Applications.

Chang, Wen-Chung et al., "3-D Point Cloud Registration Using Convolutional Neural Networks", applied sciences, Aug. 2019, 20 pages, vol. 9, Issue 16.

Pomerleau, Francois et al., "A Review of Point Cloud Registration Algorithms for Mobile Robotics", Now Foundations and Trends, May 2015, 108 pages, vol. 4, Issue 1.

* cited by examiner

SYSTEMS, METHODS, AND DEVICES FOR HEAD POSE DETERMINATION

RELATED APPLICATION(S)

The present application claims foreign priority under 35 U.S.C. § 119 to Indian Patent Application number 202041055251 filed Dec. 18, 2020, the contents of which are incorporated herein by reference in its entirety.

TECHNICAL FIELD

Various aspects of this disclosure generally relate to head pose estimation/determination.

BACKGROUND

Head-poses are a strong cue for inferring a person's intent and hence are useful in several domains or applications such as autonomous driving including pedestrian (intent) determination, human-robot collaboration, and social interactions (e.g., tracking student focus, attention and intent in adaptive learning environments). Concerning autonomous vehicles, head pose estimations can be used for determining or predicting pedestrian intent in L1 to L5 autonomy vehicles, monitoring driver attention in L2/L3/LA/ADAS vehicles. In the case of pedestrians, it is well known that pedestrian gaze is strongly indicative of pedestrian intent or heading. In road-crossing situations, for example, when a vehicle is far away, pedestrians look at the environment or the road space ahead of the vehicle; when the vehicle approaches closer, however, the gaze gradually shifts to the windshield of the vehicle. Head-pose can be used as an effective proxy for gaze, mainly when the pedestrian is far from the vehicle, and it is not possible to estimate gaze.

The accurate determination or estimation of a head-pose of a person is a challenging problem. Existing solutions rely on having access to a relatively high-resolution, frontal capture of a subject's face and assume the availability of facial landmarks. Hence, these solutions fail for various real-world scenarios in which the subject's head or face is not prominently visible, which may occur for several reasons. For example, a human subject's face might be partially occluded so that at least some facial features are obscured. For example, a subject's head may be oriented in an atypical position, or the subject's face is not fully facing the camera. A human subject, in various situations, might not be very close to the camera causing the face of the human subject to occupy a relatively small area within the captured image. Another difficult case might be when the head or face is viewed at an odd angle, rendering different levels of detail for head or face features. In such cases, it may not be possible to extract sufficient head or facial details even if the subject is directly facing the camera.

Further, lighting conditions in the real world can very. The subject's environment may not illuminate a subject face sufficiently well because the overall scene brightness might be low, or perhaps shadows are being cast on the head region in a bright scene, or contrast is high or camera sensor performs poorly e.g. against full sunlight.

BRIEF DESCRIPTION OF THE DRAWINGS

In the drawings, like reference characters generally refer to the same parts throughout the different views. The drawings are not necessarily to scale; emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, unless otherwise specified, the use of the ordinal adjectives "first", "second", "third" etc., to describe a common object, merely indicate that different instances of like objects are being referred to, and are not intended to imply that the objects so described must be in a given sequence, either temporally, spatially, in ranking, or any other manner.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment/aspect" or "an embodiment/aspect" in the present disclosure means that a particular feature, structure, or characteristic described in connection with the embodiment/aspect is included in at least one embodiment/aspect. The appearances of the phrase "for example," "in an example," or "in some examples" are not necessarily all referring to the same example.

The terms "processor" or "controller" as, for example, used herein may be understood as any kind of entity that allows handling data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit.

As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more." It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As another example, circuitry or a similar term can be an apparatus with specific functionality provided by mechanical parts operated by electric or electronic circuitry. The electric or electronic circuitry can be operated by a software application or a firmware application executed by one or more processors. The one or more processors can be internal or external to the apparatus and can execute at least a part of the software or firmware application. As yet another example, circuitry can be any apparatus that provides specific functionality through electronic components without mechanical parts; the electronic components can include one or more processors therein to execute executable instructions stored in a computer-readable storage medium and/or firmware that confer(s), at least in part, the functionality of the electronic components.

As used herein, "memory" may be understood as a non-transitory computer-readable medium where data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electromagnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in a computer-readable storage medium prior to its receipt by the receiving component. The receiving component may retrieve the signal from the storage medium. Further, a "value" that is "indicative of" some quantity, state, or parameter may be physically embodied as a digital signal, an analog signal, or stored bits that encode or otherwise communicate the value.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, i.e., a subset of a set that contains fewer elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. However, the term data is not limited to the examples above and may take various forms and represent any information as understood in the art.

Various aspects herein may utilize one or more machine learning models to perform or control functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

As described, so-called "in the wild" or challenging real-world scenarios present problems for determining or estimating head-poses. In many circumstances, a clear high-resolution frontal view of a person's face is typically not available or possible. Nevertheless, in such scenarios, it can be possible to estimate either a full body-pose of the person or the pose of other joints connected to the head such as shoulders, arms, torso, etc.

Knowledge of the full human-body pose by itself may be insufficient for accurate head pose estimation because, for body-pose estimation algorithms, a human head is typically represented as a single joint. Thus, with only knowledge of a full human body pose, it is impossible to estimate yaw, pitch, and roll. However, knowledge of the full-body pose of a person, can provide valuable information for estimation a head-pose of that person because a human head can be oriented in only along certain physiologically plausible directions.

Aspects of the present disclosure relate to devices, systems, and/or methods for determining a head-pose. Determined head-poses can be determined or represented in the form of head pose data which includes or indicates information such as, for example, the yaw, pitch, and roll angles of the head. Head pose data may be defined with respect to a frame of reference to the human subject's body. That is, head pose data can be defined independently from a world-frame or sensor/camera-frame.

Figure 1:
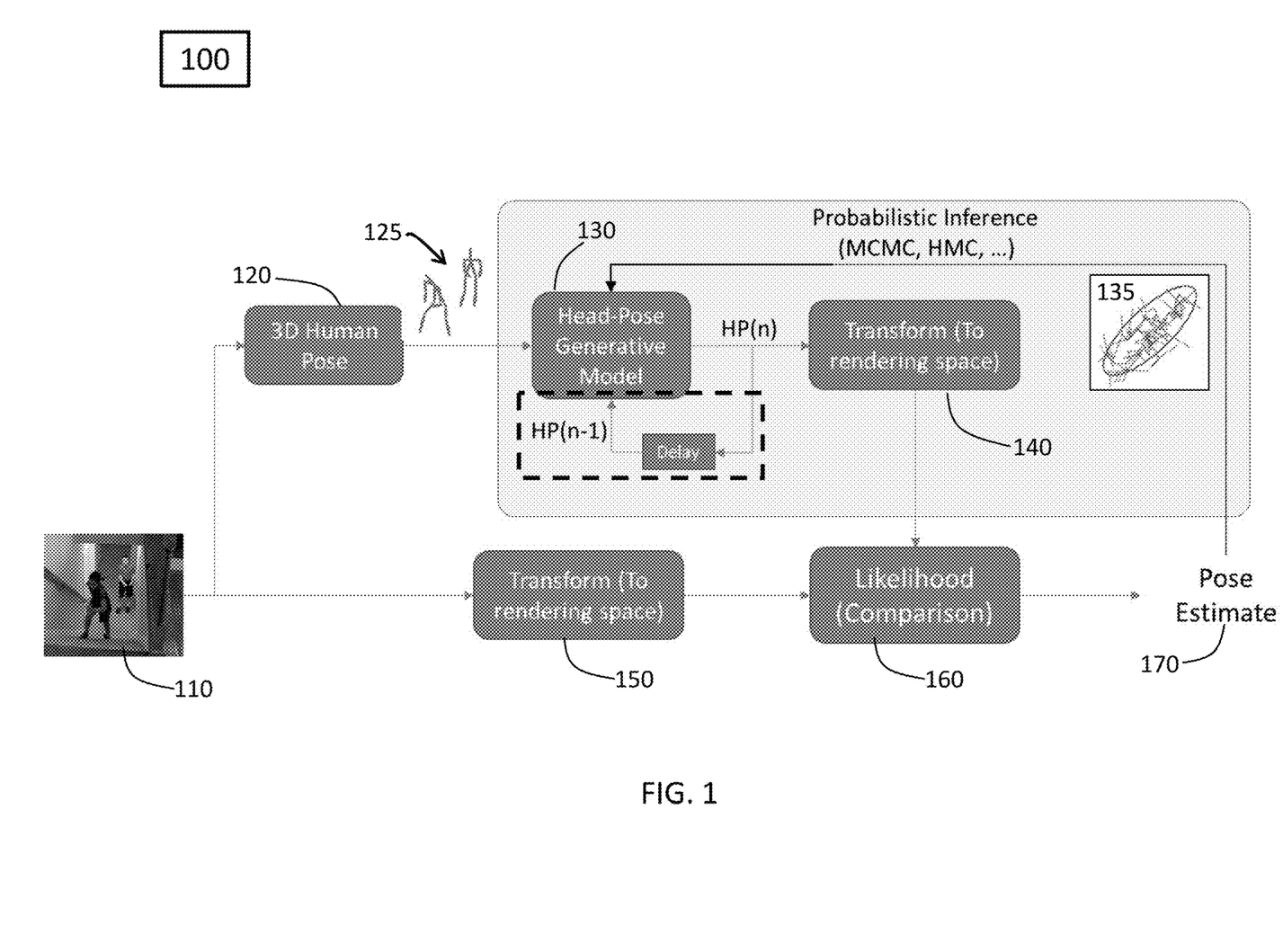
FIG. 1 shows a diagram of an exemplary process for estimating a head pose in accordance with aspects of the present disclosure.

FIG. 1 shows a diagram of an exemplary process 100 for estimating a head pose based from a human subject's sensor data. The process 100 includes, at 110, obtaining sensor data or sensor input data of a human subject. The sensor data may be in any appropriate or suitable format. In the example of FIG. 1, the sensor data can be in the form of image data that can be captured by a camera or image sensor. In other cases, the sensor data obtained may be data from other types of sensors, e.g., LIDAR sensor, which can produce point clouds, RGB camera for producing depth maps, etc.

In aspects of the present disclosure, the sensor data of the human subject includes the head of the human subject and the body (or a portion thereof) of the human subject. In some aspects, it may not be necessary that the sensor data capture all head features, including facial features (e.g., mouth, lips, nose, eyes) or other landmark features, e.g., ears. Some of the facial or other landmark features may be hidden, occluded, or the sensor data quality, e.g., image quality or lighting may not be of enough suitable quality to show or reveal such features for use.

Further, the sensor data may include or capture at least a section or portion of the human subject's body. In examples, the sensor data may include the portion of the body from the torso and above, midsection and above, chest and above, and so on. The sensor data may capture the shoulders and a portion of one or more arms portion of the body.

The obtained sensor data is then processed. At 120, a human body pose of the human body is determined or generated. This body pose may be a three-dimensional (3D) estimation. In other words, data that represents the (3D) body pose of the human subject can be determined from the sensor data. The estimated human body pose can be a full human body pose or a partial human body pose. Any known or suitable method for estimating a human body pose may be used. For example, machine learning techniques, neural networks may be used. In other cases, the body pose may be estimated using a determined trajectory that the human subject is on. Further historic pose data of the human subject may be used to generate the body pose data. That is the sensor data may be used with the historic pose data to determine body pose data or estimation. Further, in other cases, a database or knowledge of human subject poses or an environment the human subject is in, which can include other actors in the environment, may be used with the obtained sensor data to determine the body pose estimation. The database or knowledge may be used to generate a likely or estimated body pose based on the use such environment contextual information derived from the sensor data. This estimation may be done by any suitable processor executing any suitable code or software.

The estimated human body pose can then be used to generate a head pose sample data or sample data set at 130. The head pose sample data may be produced by applying a head-pose generative model to the estimated human body. Head-pose generative model referenced herein can include a conditional probabilistic distribution of head poses. The probabilistic or probability distribution can be one that is conditioned on body poses, e.g., 3D body poses. Said differently, the probability distribution of head-poses in the head-pose generative model is conditioned on a human body pose. The head-poses of such a probability distribution may be defined in terms of certain head-pose attributes (e.g., yaw, pitch, roll, etc.). Therefore, the head-pose generative model may include a conditional distribution over yaws, pitches, and roll angles.

As such, the head-pose generative model applied to the body pose data can produce data describing an estimation of a head pose in terms of such attributes. The head pose estimation generated can be considered as a head pose hypothesis, e.g., head pose data representing hypotheses for the head-pose given the estimated body pose of a human.

Further, the generated head pose data generated may be sampled. The sampling may be done by any suitable means or techniques, including for example, random sampling. Accordingly, the same determined body pose or body pose data may be used repeatedly to generate corresponding different sample sets of head pose data, e.g., different random samples.

The head-pose generative model or generative model can take advantage of the knowledge that the head pose of a human is not independent of the human's body pose. Instead, there are maximum limits on the yaw, pitch, and roll angles of the human head as dictated by human physiology. These exemplary head pose parameter or attribute limits may be denoted as $y_{max}$, $p_{max}$, and $r_{max}$, respectively. The range of angular motion of the head may therefore be $(-y_{max}, y_{max})$, $(-p_{max}, p_{max})$, and $(-r_{max}, -r_{max})$.

It is noted that people often are looking directly ahead because that is the most comfortable head position. Hence, a head-pose distribution may be initialized by a 3D Gaussian distribution with a mean (0, 0, 0) and a standard deviation proportional to the maximum yaw, pitch, and roll angles. Further, this can be done in aspects of the present disclosure where a head-pose is measured relative to the body's frame of reference instead of the sensor/camera's frame of reference.

According to other aspects of the present disclosure, a head-pose probability distribution can be realized from a head-pose distribution observed in labeled head-pose datasets. Thus, the conditional probability of a particular head-pose of such a distribution can be proportional to its frequency in the dataset.

Mathematically, the head-pose generative model can be expressed as:

$$p(HP|BP),$$

where HP represents the head pose, and BP represents the body pose.

Referring back to FIG. 1, after generating a head pose data set at 130 from the estimated human body pose data, the process 100 further includes, at 140, rendering the head pose data set. That is, the head pose data can be transformed into or used to generate a synthetic rendering ($I_s$). The synthetic rendering $I_s$ may be created from a sensor viewpoint. The synthetic rendering may be done in any suitable type of rendering space, including forms, such as photometric, binary/grayscale values, morphological maps, edge-map, etc.

Mathematically, the generation of synthetic rendering $I_s$ can be expressed as:

$$p(I_s|HP,BP),$$

where HP represents a head pose, and BP represents a body pose.

Further, at 150, the process 100 includes generating an observational rendering ($I_O$) of from the sensor input data. According to aspects of the present disclosure, the observational rendering is done having the same viewpoint (e.g., sensor point of view) and in the same rendering space (e.g., photometric, binary values, etc.) as the synthetic rendering $I_s$.

After generating the observational rendering the process 100 includes at 160 performing a comparison between the observational rendering $I_O$ and the synthetic rendering $I_s$.

The comparison between the observational rendering $I_O$ and the synthetic rendering $I_s$ may include determining one or more likeness factors between observational rendering $I_O$ and the synthetic rendering $I_s$.

In one example a likelihood function may be used. The particular likelihood function employed or used can depend on the rendering space. Some likelihood functions include one that use distance metrics like L2-norm (mean-squared error), chamfer distances (for edge maps), and measures of overlap such as the Jaccard index (for segmentation maps), to name a few.

The process 100 or aspects thereof may be repeated, e.g., iteratively. For example, head pose data generated at 130 may be repeatedly sampled. Each instance of sample data can be transformed into a render space at 140 to create a corresponding synthetic rendering that is then used in corresponding comparisons against the observational rendering at 160. The head pose sample data that corresponds to the synthetic rendering having the closest match or being closest to the observational rendering is selected to represent or estimate the head pose of the human subject.

As mentioned a likeness factor determination including a likelihood function or similar functions can be used to determine how close a synthetic rendering ($I_s$) is to the observational rendering $I_O$. These comparisons are used to find and ultimately select the best or closest set of head pose data for estimating the head pose of the human subject. The observational rendering $I_O$ serves as a standard to find the best synthetic rendering $I_s$ from which the head pose data can be selected or used.

For example, 135 may be an illustration representing the repeated or iterative head pose data sample sets that can be considered for estimation a head pose. Regarding the sampling, Monte Carlo based inferencing techniques or methods (e.g., Markov Chain Monte Carlo (MCMC), Hamiltonian Monte Carlo (HMC), etc.) may be used to sample over the space of head-poses to obtain a posterior distribution on the head-pose given an observation. The sampling used in the iterative approach can help obtain the most likely head-pose with a measure of confidence or uncertainty.

Mathematically, the posterior pose $p(HP|I_0, BP)$ produced by the process 100 can be mathematically expressed as:

$$p(HP|I_0,BP) \propto p(I_0|I_s) \times p(I_0|I_s) \times p(I_0I_s|HP,BP) \times p(HP|BP)$$

The method 100 may also be extended for sensor data in the form of video or multiple immediately successive images, e.g., a burst. That is, head poses may be estimated or determined from a slight modification to the method 100 from video or burst images obtained for one or more sensors.

For example, as shown in FIG. 1, the head-pose at time n can be denoted by $HP_n$. In one example, the process may be extended by using the Markovian assumption that $HP_n$ depends on the previously estimated head-pose, $HP_{n-1}$. As such, the following relationship may be utilized $$HP_n = f(HP_{n-1}) + v(n),$$

where the function, $f$, can be a simple motion model, and $v(n)$ system or process noise.

Therefore, with such an approach, the estimation of a current head pose can be improved by effectively imposing or using an additional prior probability, $p(HP_n|HP_{n-1})$, conditioned on the previously seen head-pose. The head pose data generated using the head-pose generative model may be realized by considering the previous sampled head pose data in addition to the estimated body pose. Such a process may assume that the synthetic rendering, $I_s$, does not depend on $HP_k$ for $k \le n-1$, and that observed body-pose is independent of $HP_{n-1}$. As such, the mathematical expression for the posterior $p(HP_n|I_0, BP, HP_{n-1})$ can be simplified to:

$$p(HP''|I_0,BP,HP_{n-1}) \propto p(I_0|I_s) \times p(I_0|I_s) p(I_0I_s|HP,BP) \times p(HP|BP) \times p(HP_n|HP_{n-1})$$

This process extension for video/burst images can be considered effectively a form of recursive Bayesian filtering, which can help smooth out temporal variations in the estimated head-pose output. Without this, the output will be much more jittery.

Figure 2:
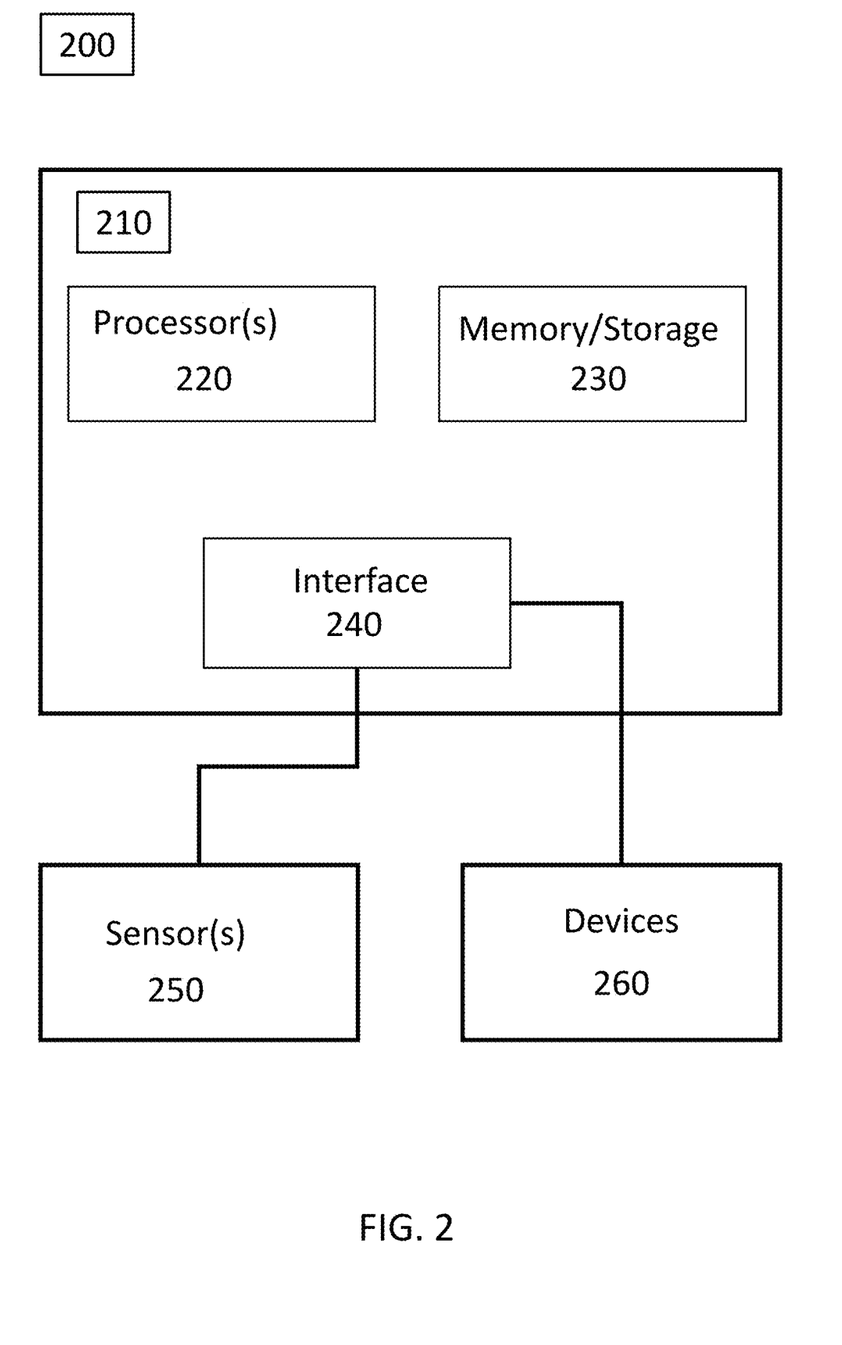
FIG. 2 shows a system according to exemplary aspects of the present disclosure.

FIG. 2 shows a system 200 that can be used in aspects of the present disclosure. The system 200 may include a head pose estimator 210, one or more sensors 250, and one or more devices 260.

The head pose estimator 210 can perform head pose estimation in accordance with aspects of the present disclosure. The head pose estimator 210 can include at least one processor 220, a memory or storage device 230 (e.g., non-transitory computer-readable medium), and an interface (e.g., communication interface). The at least one processor 210 may perform steps or processing in accordance with the processes or methods described herein. For example, the memory 230 may contain instructions or code that can be executed by the at least one processor 210 to perform such methods or processes. The head pose estimator 210 can include an interface 240 for communicating with external components or devices, such as the one or more sensors 250 and the one or more external devices 260.

The sensor(s) 250 may be any appropriate or suitable for detecting and generating sensor data of a human subject. Such sensors may include, but are not limited to, image sensors, RBG sensors, infrared (IR) sensors, LIDAR sensors, and the like. The sensor(s) 250 may be positioned or caused to face a human subject or be in the line-of-sight of the human subject's face. For example, the sensor(s) 250 may be arranged in a vehicle to face a human occupant of the vehicle, e.g., a driver of the vehicle.

Similarly, the head pose estimator 210 may provide the head pose estimation it generates and determines/selects to another device for further use. For example, the head pose estimator 210 can provide the head pose estimation (e.g., the head pose data set) to a vehicle or a component thereof, e.g., an autonomous vehicle or driver-assisted vehicle. Other devices, e.g., computing devices (e.g., desktops, laptops, tablets, mobile devices, etc.), may also obtain or receive the head pose estimation for inferring the human subject's intent.

Figure 3:
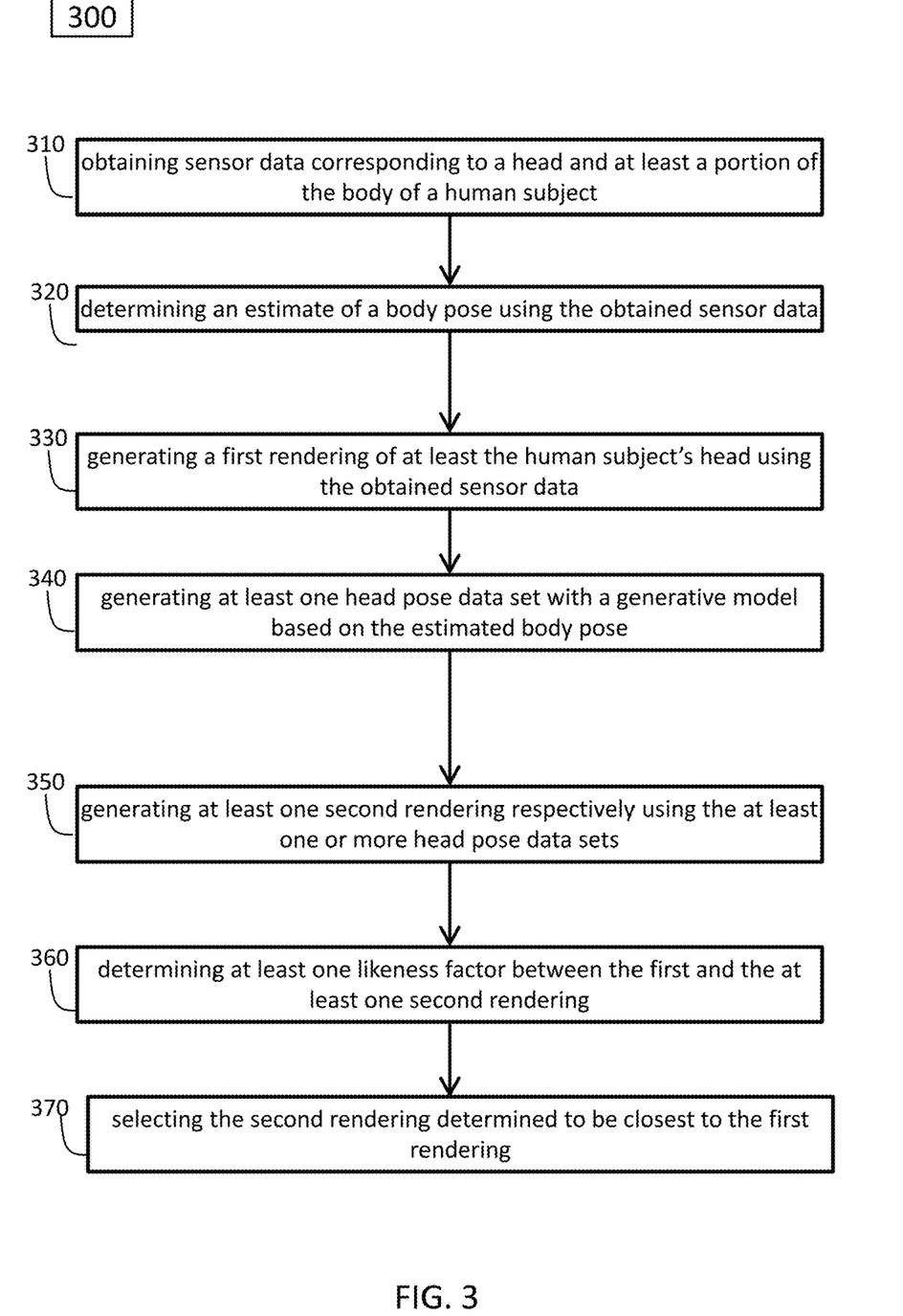
FIG. 3 shows a method according to exemplary aspects of the present disclosure.

FIG. 3 shows a method 300 that may be performed according to aspects of the present disclosure. The method or process 300 includes at 310, obtaining sensor data corresponding to a head and at least a portion of a human subject's body. At 320, the method includes determining an estimate of a three-dimensional (3D) body pose using the obtained sensor data and generating a first rendering of at least the human subject's head using the obtained sensor data at 330. The body pose may be a 3D body pose in accordance with aspects of the present disclosure.

The method further includes at 340, generating at least one head pose data set with a generative model based on the estimated body pose. At 350 the method further includes generating at least one second rendering respectively using the at least one or more head pose data sets. At 360, the method includes determining at least one likeness factor between the first and the at least one second rendering. The likenesss factor may be determined using a relevant likelihood function.

At 370, the method includes selecting the second rendering determined to be the closest match to the first rendering. The selection of the closest or best match can be done considering the at least one likeness factor.

Aspects of the present disclosure present method and devices for estimating head poses independent or not based on the use or capturing of facial landmarks. The methods or processes herein can be used in situations where a person's face is occluded (e.g., covered with the mask in one example). The method may rely on other visible features, including, but not limited to, face joints such as ears, head and, neck, and other body joints. Such an approach allows can be used to help to transform sensor data (e.g., image data) to rendered space. The approach can similarly be extended to scenarios when the head of the person or subject is covered with various types of headwear, e.g., hats, caps, etc.

In the following, various aspects of the present disclosure will be illustrated:

Example 1 is a method used for estimating a head pose including: obtaining sensor data corresponding to a head and at least a portion of the body of a human subject; determining an estimate of a three-dimensional (3D) body pose using the obtained sensor data; generating a first rendering of at least the human subject's head using the obtained sensor data; generating a plurality of head pose sample data sets comprising applying the estimated 3D body pose to a head-pose generative model, wherein each of the plurality of sample data sets are different from each other; generating a plurality of second renderings respectively from each of the plurality of head pose sample data sets; determining which of the plurality of second renderings is closest to the first rendering; and selecting the second rendering determined to be closest to the first rendering.

Example 2 is the subject matter of Example 1, wherein determining which one of the plurality of second renderings is closest to the first rendering may include determining which one of the plurality of second renderings is closest to the first rendering using a likelihood function.

Example 3 is the subject matter of Example 1 or 2, which may further include: selecting the head pose sample data set corresponding to the second rendering determined closest to the first rendering.

Example 4 is the subject matter of any of Examples 1 to 3, wherein generating the head pose sample data set may include generating a random sampling of head pose data.

Example 5 is the subject matter of any of Examples 1 to 4, wherein generating the first rendering may include generating the first rendering from a viewpoint corresponding to a sensor origin viewpoint of the obtained sensor data.

Example 6 is the subject matter of any of Examples 1 to 5, wherein the first and second renderings can be rendered in a same render space.

Example 7 is the subject matter of any of Examples 1 to 6, wherein the first and second renderings can include binary or gray scale values.

Example 8 is the subject matter of any of Examples 1 to 6, wherein the first and second renderings can include photometric maps or edge maps.

Example 9 is the subject matter of any of Examples 1 to 8, wherein the obtained sensor data can correspond at least to a portion of the human subject's body above the waist.

Example 10 is the subject matter of any of Examples 1 to 9, wherein one or more facial features of human subject's head in the obtained sensor data can be concealed or occluded.

Example 11 is the subject matter of Example 10, wherein the one or more facial features can include a mouth, a nose, eye, and/or ears of the human subject.

Example 12 is the subject matter of any of Examples 1 to 11, wherein the head pose generative model can include a conditional probability distribution of head pose data sets.

Example 13 is the subject matter of Example 12, wherein the conditional probability distribution of head pose data sets can include a conditional probability distribution of one or more head pose parameters.

Example 14 is the subject matter of Example 13, wherein the one or more head pose parameters can include yaw, pitch, and/or roll angles.

Example 15 is the subject matter of Example 12, wherein the conditional probability distribution of head pose data sets can include a conditional probability distribution of observed head-pose data sets.

Example 16 is the subject matter of any of Examples 1 to 15, wherein the obtained sensor data can include image data.

Example 17 is the subject matter of any of Examples 1 to 16, wherein the obtained sensor data can include LIDAR point-cloud data.

Example 18 is the subject matter of any of Examples 1 to 17, wherein the obtained sensor data can include video data.

Example 19 is the subject matter of Example 18, wherein determining an estimate of a 3D body pose can include determining a 3D body pose for each of a plurality of sequential frames from the video data, and wherein generating the plurality of head pose sample data sets can include successively applying each of the estimated 3D body poses and applying a corresponding previously generated head pose sample data to the head-pose generative model.

Example 1A is a head pose estimator including: at least one processor; and a non-transitory computer readable medium comprising instructions that when executed by the at least one processor cause the at least one processor to: obtain sensor data corresponding to a head and at least a portion of the body of a human subject; determine an estimate of a body pose using the obtained sensor data; generate a first rendering of at least the human subject's head using the obtained sensor data; for each of a plurality of iterations: generate a head pose sample data set by applying the estimated body pose to a head-pose generative model, wherein the head pose sample data set of a subsequent iteration is different from the head pose sample data of a previous iteration, generate second renderings respectively from the plurality of head pose sample data sets, and perform comparisons between respectively between each of the plurality of second renderings to the first rendering; and the at least one processor further configured to select one of the plurality of the second renderings that is closest to the first rendering based on the comparisons.

Example 2A is the subject matter of Example 1A, wherein to perform the comparisons can include to apply a likelihood function between the each of the plurality of second renderings and the first rendering, wherein the at least one processor is configured to select the one of the plurality of second renderings that is closest to the first rendering based on the comparisons using the likelihood function.

Example 3A is the subject matter of Example 1A or 2A, wherein to generate the head pose sample data set can include to generate a random sampling of head pose data.

Example 4A is the subject matter of any of Examples 1A to 3A, wherein to generate the first rendering can include to generate the first rendering from a viewpoint corresponding to a sensor origin viewpoint of the obtained sensor data.

Example 5A is the subject matter of any of Examples 1A to 4A, wherein the first and second renderings can be rendered in a same render space.

Example 6A is the subject matter of any of Examples 1A to 5A, wherein the first and second renderings can include binary or gray scale values.

Example 7A is the subject matter of any of Examples 1A to 5A, wherein the first and second renderings comprise photometric maps or edge maps.

Example 8A is the subject matter of any of Examples 1A to 7A, wherein the obtained sensor data can correspond at least to a portion of the human subject's body above the waist.

Example 9A is the subject matter of any of Examples 1A to 8A, wherein one or more facial features of human subject's head in the obtained sensor data can be concealed or occluded.

Example 10A is the subject matter of Example 9A, wherein the one or more facial features comprise a mouth, a nose, eye, and/or ears of the human subject.

Example 11A is the subject matter of any of Examples 1A to 10A, wherein the head pose generative model can include a conditional probability distribution of head pose data sets, the distribution conditioned on body poses.

Example 12A is the subject matter of Example 11A, wherein the conditional probability distribution of head pose data sets can include a conditional probability distribution of one or more head pose parameters.

Example 13A is the subject matter of Example 12A, wherein the one or more head pose parameters can include yaw, pitch, and/or roll angles.

Example 14A is the subject matter of Example 11A, wherein the conditional probability distribution of head pose data sets comprises a conditional probability distribution of observed head-pose data sets.

Example 15A is the subject matter of any of Examples 1A to 14A, wherein the obtained sensor data can include image data.

Example 16A is the subject matter of any of Examples 1A to 15A, wherein the obtained sensor data can include LIDAR point-cloud data.

Example 17A is the subject matter of any of Examples 1A to 16A, wherein the obtained sensor data can include video data.

Example 18A is the subject matter of Example 17A, wherein to determine an estimate of the body pose can include to determine a body pose for each of a plurality of sequential frames from the video data, wherein to generate the plurality of head pose sample data sets can include to successively apply each of the estimated 3D body poses and to apply a corresponding previously generated head pose sample data to the head-pose generative model.

Example 19A is the subject matter of any of Examples 1A to 18A, wherein the estimated body pose can be an estimated three-dimensional (3D) body pose.

Example 1B is a system including one or more sensors configured to capture sensor data of a human subject; and a head pose estimator of any of Examples 1A to 19A.

Example 1C is a head pose estimator including means for obtaining sensor data corresponding to a head and at least a portion of the body of a human subject; means for determining an estimate of a body pose using the obtained sensor data; means for generating a first rendering of at least the human subject's head using the obtained sensor data; wherein for each of a plurality of iterations: means for generating a head pose sample data set by applying the estimated body pose to a head-pose generative model, wherein the head pose sample data set of a subsequent iteration is different from the head pose sample data of a previous iteration, means for generating second renderings respectively from the plurality of head pose sample data sets, and means for performing comparisons between respectively between each of the plurality of second renderings to the first rendering; and means for selecting one of the plurality of the second renderings that is closest to the first rendering based on the comparisons.

Example 1D is method used for estimating a head pose including: obtaining sensor data corresponding to a head and at least a portion of the body of a human subject; determining an estimate of a body pose using the obtained sensor data; generating a first rendering of at least the human subject's head using the obtained sensor data; generating at least one head pose data set with a generative model based on the estimated body pose, generating at least one second rendering using the at least one head pose dataset; and determining at least one likeness factor between the first and the at least one second rendering.

Example 2D is the subject matter of Example 1D, wherein determining the estimate of the body pose using the obtained sensor data may include using one or more of a machine learning technique, a neural network, a trajectory the human subject is on, historic pose data of the human subject, or a database of human subject poses, an environment the human subject is in, other actors in the environment.

Example 3D is the subject matter of Example 1D or 2D, wherein the body pose can include a 3D body pose.

Example 4D is the subject matter of any of Examples 1D to 3D, wherein the at least one head pose data set can include a plurality of head pose data sets, and wherein generating the at least one respective second rendering comprises generating a plurality of second renderings respectively from using the plurality of the head pose data sets, and wherein determining the at least one likeness factor comprises determining a likeness factor for each of the plurality of second renderings.

Example 5D is the subject matter of Example 4D, which can further include determining one of a plurality of second renderings to be closest to the first rendering using the respective likeness factor.

Example 6D is the subject matter of any of Examples 1D to 5D, wherein determining which one of the plurality of second renderings is closest to the first rendering can include determining which one of the plurality of second renderings is closest to the first rendering using a likelihood function.

Example 7D is the subject matter of any of Examples 1D to 6D, which can further include: selecting the head pose data set corresponding to the second rendering determined closest to the first rendering.

Example 8D is the subject matter of any of Examples 1D to 7D, wherein generating the head pose data set can include generating a random sampling of head pose data.

Example 9D is the subject matter of any of Examples 1D to 8D, wherein generating the first rendering can include generating the first rendering from a viewpoint corresponding to a sensor origin viewpoint of the obtained sensor data.

Example 10D is the subject matter of any of Examples 1D to 9D, wherein the first and second renderings are rendered in a same render space.

Example 11D is the subject matter of any of Examples 1D to 10D, wherein the obtained sensor data can correspond at least to a portion of the human subject's body above the waist.

Example 12D is the subject matter of any of Examples 1D to 11D, wherein one or more facial features of human subject's head in the obtained sensor data can be concealed or occluded.

Example 13D is the subject matter of any of Examples 1D to 12D, wherein the generative model can include a conditional probability distribution of head pose data sets.

Example 14D is the subject matter of Example 13D, wherein the conditional probability distribution of head pose data sets can include a conditional probability distribution of one or more head pose parameters.

Example 15D is the subject matter of Example 13D, wherein the conditional probability distribution of head pose data sets comprises a conditional probability distribution of observed head-pose data sets.

Example 16D is the subject matter of 1D, wherein the obtained sensor data can include video data.

Example 17D is the subject matter of Example 16D, wherein determining an estimate of the body pose can include determining a body pose for each of a plurality of sequential frames from the video data, and wherein generating the at least one head pose data sets can include successively applying each of the estimated 3D body poses and applying a corresponding previously generated head pose data to the generative model.

Example 1E is a non-transitory computer readable medium including instructions that when executed by the at least one processor cause the at least one processor to perform a method of any of Examples 1D to 17D.

Example 1F is a head pose apparatus including: an interface, coupled to at least one sensor, to receive sensor data from the at least one sensor, the sensor data corresponding to a head and at least a portion of the body of a human subject; a head pose estimator including: at least one processor; and a non-transitory computer readable medium comprising instructions that when executed by the at least one processor cause the at least one processor to: perform a method of any of Examples 1D to 17D or any of Examples 1 to 19.

Example 1G is a head pose estimator including: means for obtaining sensor data corresponding to a head and at least a portion of the body of a human subject; means for determining an estimate of a body pose using the obtained sensor data; means for generating a first rendering of at least the human subject's head using the obtained sensor data; means for generating head pose data; means for generating at least one second rendering from the head pose data, and means for selecting one of the plurality of the second renderings that is closest to the first rendering.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A non-transitory computer readable medium comprising instructions that
    when executed by the at least one processor cause the at least one processor to:
    obtain sensor data corresponding to a head and at least a portion of the body of a human subject;
    determine an estimate of a body pose using the obtained sensor data;
    generate a first rendering of at least the human subject's head using the obtained sensor data;
    generate at least one head pose data set with a generative model based on the estimated body pose,
    generate at least one second rendering using the at least one head pose dataset; and
    determine at least one likeness factor between the first and the at least one second rendering.

2. The computer readable medium of claim 1, wherein to determine the estimate of the body pose using the obtained sensor data comprises to use one or more of a machine learning technique, a neural network, a trajectory the human subject is on, historic pose data of the human subject, or a database or knowledge of human subject poses, an environment context the human subject and/or other actors is in.

3. The computer readable medium of claim 1, wherein the body pose is a 3D body pose.

4. The computer readable medium of claim 1, wherein the at least one head pose data set comprises a plurality of head pose data sets, and wherein to generate the at least one respective second rendering comprises to generate a plurality of second renderings respectively from using the plurality of the head pose data sets, and wherein to determine the at least one likeness factor comprises to determine a likeness factor for each of the plurality of second renderings.

5. The computer readable medium of claim 4, wherein the instructions when executed, further cause the at least one processor to further determine one of the plurality of second renderings to be closest to the first rendering using the respective likeness factor.

6. The computer readable medium of claim 1, wherein to determine which one of the plurality of second renderings is closest to the first rendering comprises to determine which one of the plurality of second renderings is closest to the first rendering using a likelihood function.

7. The computer readable medium of claim 1, wherein the instructions when executed, further cause the at least one processor to:
    select the head pose data set corresponding to the second rendering determined closest to the first rendering.

8. The computer readable medium of claim 1, wherein to generate the head pose data set comprises to generate a random sampling of head pose data.

9. The computer readable medium of claim 1, wherein to generate the first rendering comprises to generate the first rendering from a viewpoint corresponding to a sensor origin viewpoint of the obtained sensor data.

10. The computer readable medium of claim 1, wherein the at least one processor renders the first and second renderings in a same render space.

11. The computer readable medium of claim 1, wherein one or more facial features of human subject's head in the obtained sensor data are concealed or occluded.

12. The computer readable medium of claim 1, wherein the generative model comprises a conditional probability distribution of head pose data sets.

13. The computer readable medium of claim 12, wherein the conditional probability distribution of head pose data sets comprises a conditional probability distribution of one or more head pose parameters.

14. The computer readable medium of claim 12, wherein the conditional probability distribution of head pose data sets comprises a conditional probability distribution of observed head-pose data sets.

15. The computer readable medium of claim 1, wherein the obtained sensor data comprises video data.

16. The computer readable medium of claim 15,
    wherein determining an estimate of the body pose comprises determining a body pose for each of a plurality of sequential frames from the video data, and
    wherein generating the at least one head pose data sets comprising successively applying each of the estimated 3D body poses and applying a corresponding previously generated head pose data to the generative model.

17. A head pose apparatus comprising:
    an interface, coupled to at least one sensor, to receive sensor data from the at least one sensor, the sensor data corresponding to a head and at least a portion of the body of a human subject;
    a head pose estimator comprising:
        at least one processor; and
        a non-transitory computer readable medium comprising instructions that when executed by the at least one processor cause the at least one processor to:
        determine an estimate of a body pose using the obtained sensor data;
        generate a first rendering of at least the human subject's head using the obtained sensor data;

generate at least one head pose data set with a generative model based on the estimated body pose,
generate at least one second rendering using the at least one head pose dataset; and
determine at least one likeness factor between the first and the at least one second rendering.

18. The head pose apparatus of claim 17, wherein the at least one head pose data set comprises a plurality of head pose data sets, and wherein to generate the at least one respective second rendering comprises to generate a plurality of second renderings respectively from using the plurality of the head pose data sets, and wherein to determine the at least one likeness factor comprises to determine a likeness factor for each of the plurality of second renderings.

19. The head pose apparatus of claim 17, wherein the instructions when executed, further cause the at least one processor to further determine one of the plurality of second renderings to be closest to the first rendering using the respective likeness factor.

20. A head pose estimator comprising:
means for obtaining sensor data corresponding to a head and at least a portion of the body of a human subject;
means for determining an estimate of a body pose using the obtained sensor data;
means for generating a first rendering of at least the human subject's head using the obtained sensor data;
means for generating head pose data;
means for generating at least one second rendering from the head pose data, and means for selecting one of the plurality of the second renderings that is closest to the first rendering.

* * * * *